United States Patent
Kaiser

(10) Patent No.: US 12,046,825 B2
(45) Date of Patent: Jul. 23, 2024

(54) ANTENNA ARRANGEMENT AND RAIL VEHICLE HAVING A PLURALITY OF ANTENNAS

(71) Applicant: Siemens Mobility GmbH, Munich (DE)

(72) Inventor: Frank Kaiser, Berlin (DE)

(73) Assignee: Siemens Mobility GmbH, Munich (DE)

(*) Notice: Subject to any disclaimer, the term of this patent is extended or adjusted under 35 U.S.C. 154(b) by 383 days.

(21) Appl. No.: 17/416,617

(22) PCT Filed: Dec. 10, 2019

(86) PCT No.: PCT/EP2019/084416
§ 371 (c)(1),
(2) Date: Jun. 21, 2021

(87) PCT Pub. No.: WO2020/126668
PCT Pub. Date: Jun. 25, 2020

(65) Prior Publication Data
US 2022/0077601 A1 Mar. 10, 2022

(30) Foreign Application Priority Data
Dec. 20, 2018 (DE) .......................... 102018222589.3

(51) Int. Cl.
*H01Q 1/32* (2006.01)
*H01Q 1/52* (2006.01)
*H01Q 21/28* (2006.01)

(52) U.S. Cl.
CPC .......... *H01Q 21/28* (2013.01); *H01Q 1/3275* (2013.01); *H01Q 1/525* (2013.01)

(58) Field of Classification Search
CPC .......... H01Q 21/28; H01Q 1/525; H01Q 1/24; H01Q 1/52; H01Q 1/521; H01Q 1/3275;
(Continued)

(56) References Cited

U.S. PATENT DOCUMENTS 9,554,285 B2 * 1/2017 Zasowski .............. H04W 16/26
2012/0136514 A1 * 5/2012 Noffsinger .......... B61L 15/0027
701/19

(Continued)

FOREIGN PATENT DOCUMENTS

DE 102015211336 A1 12/2016
DE 102016200085 A1 7/2017
(Continued)

*Primary Examiner* — Awat M Salih
(74) *Attorney, Agent, or Firm* — Laurence A. Greenberg; Werner H. Stemer; Ralph E. Locher

(57) ABSTRACT

An antenna arrangement for the mobile communication of a rail vehicle and a rail vehicle with an antenna arrangement of the type. The antenna arrangement has at least two transmitting antennas and at least two receiving antennas. The transmitting antennas are spatially grouped in a transmitting group and the receiving antennas are spatially grouped in a receiving group. The distances between the transmitting antennas and between the receiving antennas is smaller than the overall distance between the transmitting group and the receiving group. The antennas can thereby be arranged in a much more space-saving fashion on the vehicles because large distances have to be provided only between the groups, not between the antennas within the groups. Where the space needed is low, interference-free operation of the antennas is thus advantageously possible.

18 Claims, 2 Drawing Sheets

(58) Field of Classification Search
CPC ......... H01Q 1/32; B61L 27/70; B61L 27/202; B61L 2205/02; B61L 15/0027; H04B 7/04

See application file for complete search history.

(56) References Cited

U.S. PATENT DOCUMENTS

| | | | |
|---|---|---|---|
| 2012/0184317 A1* | 7/2012 | Ihm | H04L 5/0048 455/509 |
| 2014/0111391 A1* | 4/2014 | Nagata | H01Q 1/3241 343/713 |
| 2018/0123632 A1 | 5/2018 | Posselt et al. | |

FOREIGN PATENT DOCUMENTS

| | | | |
|---|---|---|---|
| DE | 102016215315 A1 | | 2/2018 |
| DE | 102016221758 A1 | | 5/2018 |
| EP | 2755440 A1 | | 7/2014 |
| JP | JPWO2003028299 | * | 1/2005 |
| WO | 2007025309 A1 | | 3/2007 |

* cited by examiner

ANTENNA ARRANGEMENT AND RAIL VEHICLE HAVING A PLURALITY OF ANTENNAS

BACKGROUND OF THE INVENTION

Field of the Invention

The invention relates to an antenna arrangement for mobile communication of a rail vehicle, the antenna arrangement having at least two transmitting antennas and at least two receiving antennas. The invention also relates to a rail vehicle having such an antenna arrangement.

Rail vehicles that are equipped with a standardized ETCS (European Train Control System) mobile radio system and are operated in accordance with ETCS Level 2 or 3 use the digital mobile radio network GSM-R (R stands for Railway) for communication with the responsible center or control center (in technical terms RBC or Radio Block Center). In order to guarantee seamless train safety, the mobile radio facilities—also called OBUs (OBU or On Board Unit) in technical terms—are usually equipped with three GSM-R transceivers (transmit and receive units) in each case. Two of the transceivers serve, during a transition from the radio block center currently responsible in each case to the next radio block center responsible in each case, to make two parallel mobile radio connections possible, namely one to the preceding radio block center and also one to the following radio block center. A third transceiver makes possible voice communication between the locomotive driver and the rail service provider (train radio for short). A further communication system can be used for automatic control of the trains, also called ATO or Automated Train Operation. ATO knows the timetable of the vehicle, the speed profile predetermined by ETCS, its position and its speed. It calculates the "optimal" speed and controls the motors and brakes accordingly. Optimal can be the earliest arrival for example but especially also energy-optimized travel. One or two transceivers are provided for this ATO control, depending on requirements. Thus, taking into account the applications on a rail vehicle, for example a locomotive, explained here, up to five transceivers are required.

In future there are also plans for communication with the rail vehicle to be handled using FRMCS (Future Railway Mobile Communications System). This involves an innovative system in which the available bandwidth is made available via a router to different applications of the rail vehicle. In such cases, various communication standards in addition to GSM-R can be used, for example UMTS (3G), LTE (4G) and the planned 5G standard. What is more WLAN can also be used, depending on availability, at stations for example.

The use of a number of terminals or the use of a number of mobile radio standards and also WLAN make it necessary to install a number of antennas at the same time on the rail vehicle. Since these interfere with each other in different ways, it is therefore necessary to ensure a minimum decoupling. A possible means for this is what is known as free-space attenuation, which includes the attenuation between two antennas as a function of their distance from one another. Another means are suitable filters or a screening or also a directional characteristic of the antennas (wherein this only plays a subordinate role for a vehicle on account of the lack of all-round visibility). In this way the said interference influences are limited to a maximum allowed by the function. On the other hand the installation space made available by the rail vehicle for the antennas is limited.

In accordance with DE 10 2016 221 758 A1 it is known that an improvement in the transmit and receive quality can be achieved by separate transmitting antennas and receiving antennas being provided. What can be achieved by this is that a feeding back of own transmit signals into own receiving paths can largely be avoided. However this measure has the effect that twice as many aerials have to be installed on the rail vehicle, whereby the problem of limited installation space is made more intense. Although the use of filters would let the distance between the antennas be reduced, the use of filters also leads to an attenuation of the signals and to an increase in costs for the antenna system and thus to undesired accompanying effects.

SUMMARY OF THE INVENTION

The underlying object of the invention is to specify an antenna arrangement for a vehicle, especially a rail vehicle, which makes possible reliable transmitting and receiving operation with limited available space. Moreover the object of the invention is to specify a rail vehicle with such an antenna arrangement.

This object is achieved in accordance with the invention with the antenna arrangement specified at the outset for mobile communication of a vehicle, by the transmitting antennas being spatially grouped in a transmitting group and the receiving antennas being spatially grouped in a receiving group, wherein
- the distances between the transmitting antennas is smaller than the required distance between the transmitting group and the receiving group, and also
- the distances between the receiving antennas is smaller than the distance required between the transmitting group and the receiving group.

The inventive principle on which the antenna arrangement described herein is based makes use of the knowledge that the distance between individual antennas that are normally used for transmitting and receiving, primarily, because of the transmit function of these antennas when transmitting signals must be of the order of magnitude of several meters. If each terminal is supplied by a separate transmitting antenna and receiving antenna however, then the transmitting antennas and also the receiving antennas can be arranged at a significantly smaller distance from one another. In this way the transmitting group and the receiving group in accordance with the invention is produced, wherein said groups must be arranged at a greater distance from one another.

The advantage of the inventive arrangement will be explained below with the aid of a computational example. If for example four combined transmitting and receiving antennas are used, which must each be at a distance of 5 m from one another on a path behind one another, then each antenna must have a free radius of 5 m without further antennas. Thus the antennas must be accommodated on a path of 15 m. For the first and last antennas of this series a distance of 5 m from further antennas must also be taken into account, whereby an overall distance of 25 m is required for interference-free operation of the antennas.

If however the antennas of this example are arranged in a transmitting group and a receiving group, wherein the distance of the antennas from one another can be assumed to be 30 cm, then the two groups (i.e. the transmitting group and the receiving group) can be arranged at a distance of 5 m from one another. Since the two groups with a square arrangement of the antennas have an extent of 30 cm, the installation space is thus restricted to 5.60 m. If the radius to other antenna groups is taken into account, an overall installation space of 15.60 m is required.

When determining the necessary distance between the antennas various influencing factors are to be taken into account, which will be explained below.

The return loss in particular is responsible for the power loss at an individual stationary antenna. This arises through a mismatch, i.e. the surge impedance of the antenna differs from that of the cable. This leads to a part reflection of the power in the form of a standing wave. This reflected power is converted into losses for the most part by the internal resistance of the transmitter. This effect cannot be entirely prevented in practice. In practice the return loss of an antenna amounts to 12-14 dB (at 10 dB 10% of the energy would be reflected for example, at 13 dB 5%).

If a further transmitting antenna is placed in the vicinity of the transmitting antenna, then the latter will accept a part of the power emitted by the former and convert it into heat in the connected transmitter. The losses in this case are primarily dependent on the decoupling of the antennas from one another. As the distance increases the losses decrease. From the standpoint of the first transmitter these losses are added to those caused by the return loss. This effect can be influenced by how far apart the antennas are. With receiving antennas similar effects are to be observed, even if their causes differ from those in transmitting antennas.

An optimization of the one loss (influence of adjacent antennas) significantly beyond that of the other loss (return loss) does not bring any appreciable improvements. Thus a sensible limit for the losses from other antennas is produced even with 10-15 dB. It should be noted that naturally the losses add up from all antennas located in the vicinity. If for example 4 antennas have been arranged in a square, then the losses caused by the other antennas increase by 4-5 dB compared to only one antenna at a distance of one side of the square (two antennas) with basic spacing produces 3 dB, in addition there is also a further antenna roughly estimated at 1.41 times the spacing, i.e. 1-2 dB.

With this approach the distance produced between the transmitting antennas in GSM-R transceivers is around Lambda (wavelength of the working frequency), which at 900 MHz working frequency lies at 30-35 cm. Ultimately this also applies to receiving antennas.

With receiving antennas two aspects must be taken into account for effectively countering interference. Within the working band of the receiver considered in each case assigned to the receiving antenna the interference signals of neighboring antennas, taking account of a minimum signal-to-noise ratio necessary for decoding for example, must be at least 9 dB weaker than the required sensitivity of this receiving antenna. The working band in this case is the frequency range in which the receiving antenna is to receive radio signals (1st aspect). Outside the working band of the working antenna considered in each case, interference signals from neighboring antennas should each be weaker than the blocking limit value of the associated receiver. Blocking is understood as the resistance of a receiver to signals outside the working band (2nd aspect). Both aspects in relation to all transmitting/receiving antenna combinations are to be considered when determining the distance between transmitting and receiving antenna group. The largest of these values a1 applies definitively.

The advantages of the inventive embodiment of the antenna arrangement and also of the rail vehicle equipped the antenna arrangement can thus be summarized as follows.

The transmitting and receiving antennas can be arranged in their respective antenna module with a minimized distance between them, wherein the fact that the respective antennas are only used for transmitting or only for receiving allow a comparatively small distance.

The interference influence between transmitting module and receiving module that must be taken into account can be employed once for determining the distance between transmitting module and receiving module. This means that for the antenna arrangement in which the antennas are grouped into a transmitting module and a receiving module, the space required overall is reduced.

The transmitting module and the receiving module can be pre-installed in each case, so that the final installation at the location (for example a vehicle, in particular a rail vehicle) is reduced. This brings about a cost benefit in final installation. In accordance with one embodiment of the invention there is accordingly provision for the transmitting module and/or the receiving module to be designed as pre-installed modules.

In accordance with one embodiment of the invention there is provision for at least a part of the transmitting antennas and a part of the receiving antennas to be designed for the GSM-R standard and/or for the FRMCS standard.

Antennas working according to the GSM-R standard (where antennas in general are referred to below, then the passages involved always apply equally to the transmitting antennas and receiving antennas) are usually assigned to a specific application (assigned means a signaling connection for example). This assignment is made by a transceiver, a transmitting and receiving facility for radio signals, which sends signals received to the application and receives signals from the application. The advantage of antennas that work according to the GSM-R standard is that this technology is widely applicable in the market and is reliable and low-cost.

The FRMCS standard makes it possible to connect various applications to a router, which for its part can be equipped with a number of transmitting and receiving antennas. In this case these antennas can transmit and receive in different bands, so that each application can transmit and receive signals via different systems. This guarantees availability with an advantageously greater coverage, which in particular is of great advantage for automated vehicle traffic because of the safety requirements associated therewith.

In accordance with an embodiment of the invention there is provision for the transmitting antennas and also for the receiving antennas to have a distance between them of at least the wavelength ($1 \times \lambda$) of the transmitting or receiving band.

It has been shown to be advantageous that, by assignment to the wavelength of the transmitting or receiving band, a simple design rule is produced for the transmitting module and receiving module in respect of the antenna distances to be chosen. Here it is always the transmitting and receiving band for neighboring antennas that uses the greater wavelength that is decisive. If this design rule is taken into consideration, a sufficiently large decoupling of the transmitting antennas from one another and of the receiving antennas from one another is able to be achieved.

In accordance with one embodiment of the invention there is provision that
a decoupling resulting from the antenna distance between all transmitting antennas of the transmitting group and
a decoupling resulting from the antenna distance between all receiving antennas of the receiving group
is greater than 10 dB, preferably greater than 15 dB.

As already explained above, advantageously a design rule is involved with which the distances between the transmitting antennas and between the receiving antennas can be determined. Here the process can be in particular that the antennas of the transmitting module and also the antennas of the receiving module are installed and the decoupling is measured as a result of their distances from one another. If the decoupling is not sufficient the antenna distance must be increased until a sufficient decoupling is measured. For the purposes of establishing the required distances by measurement and experiment a test apparatus for installing the transmitting module and also the receiving module can be used, in which the attachment points of the antennas are arranged movably in the test apparatus, so that the distance between the antennas is able to be varied. Another approach to designing the antenna distances is the use of appropriate computational approaches.

In accordance with an embodiment of the invention there is provision for the signal, in the working band of a respective receiver to be assigned to the receiving antenna coming from each of the transmitting antennas, to be smaller than the sensitivity of the receiver reduced by the minimum signal-to-noise ratio of the signal needed for decoding, outside the working band of the respective receiver coming from each of the transmitting antennas, to be smaller than the blocking limit value of the receiver.

As already explained above, a design rule is advantageously involved here, with which the distance between transmitting module and receiving module can be determined, so that a sufficient decoupling between the antenna groups can be achieved. This design rule too can be found out in the course of experimenting with the different antennas.

To this end the transmitting module and the receiving module must be set up and subsequently tested with different distances between them. In such cases the transmitting antennas must transmit with the power necessary for the application. The signal arriving from each of the transmitting antennas at the receiving antenna concerned is measured and compared with the minimum signal-to-noise ratio of the signal required for decoding, in such cases only signals are considered that are located in the working band of the receiving antennas.

Moreover signals of the transmitting antennas that are located outside the working band of the respective receiver are also considered. These may not be higher in respect of their measurement result than the blocking limit value of a receiver that is connected to the receiver antenna concerned under investigation. This means that in the design of the working band and the limit values of the transmit power, the adjacent channel emission of the transmitter, the sensitivity of the receiver and also for the blocking of the receivers must be known, even when the respective receiver is not yet connected to the antenna arrangement to be designed (and the antenna arrangement is also to be delivered without the associated receiver).

Both experimental results must be considered together. The one that leads to a larger required distance of the transmitting group from the receiving group must be considered for the design. Naturally computations can also be used for the design of the distance between the transmitting group and the receiving group.

As an alternative, the said object is also inventively achieved by the claimed subject matter specified at the outset (rail vehicle) by the transmitting antennas being grouped spatially in a transmitting group, wherein the distances between the transmitting antennas are smaller than the distance between the transmitting group and the receiving group, and also the distances between the receiving antennas are smaller than the distance between the transmitting group and the receiving group.

The specifications given above for the inventive antenna arrangement apply analogously to a rail vehicle with such an antenna arrangement. The advantages associated with the antenna arrangement are also achieved in equal measure by the rail vehicle in which or on which such an antenna arrangement is installed. Therefore these will not be discussed at any greater length here.

In accordance with an embodiment of the invention there is provision for a decoupling between all transmitting antennas of the transmitting group caused by the antenna distance and a decoupling between all receiving antennas of the receiving group caused by the antenna distance to be greater than 10 dB, preferably greater than 15 dB and for the signal in the working band or a respective receiver assigned to the receiving antenna coming from each of the transmitting antennas to be smaller than the sensitivity of the receiver reduced by the reduced by the minimum signal-to-noise ratio of the signal needed for decoding, outside the working band of the respective receiver coming from each of the transmitting antennas to be smaller than the blocking limit value of the receiver.

In order to guarantee in the rail vehicle an effective decoupling of all transmitting antennas and all receiving antennas from one another and at the same time an effective decoupling of the transmitting group and the receiving group, the design rules in accordance with this embodiment must be considered at the same time. Only in this way is it guaranteed that, as a result of a sufficient decoupling, all antennas can work with each other with low interference.

The situation is different for the antenna arrangement given above. In its as-delivered state, this has a transmitting group and a receiving group. Naturally consideration must be given to the design rules in respect of the damping of the transmitting antennas and the receiving antennas in each case. This means that the distances between the transmitting antennas in the transmitting group and the distances between the receiving antennas in the receiving group must be determined taking into consideration the interference influences between them, before the transmitting group and the receiving group are installed. By pre-installing the transmitting group and the receiving group it is therefore possible for there to be a final installation of these modules without taking into consideration the design rules given above for the antenna distances between the transmitting antennas and between the receiving antennas in each case. Said rules have already been considered in the manufacturing of the transmitting group and the receiving group and determine the geometry of these modules.

The distance between the transmitting group and the receiving group, however, is only to be taken into consideration when the antenna arrangement is installed at the installation site (for example a rail vehicle). If the receivers to be used are known, this can already be determined and defined as an installation rule for the antenna arrangement. This is not absolutely required however. As an alternative the necessary distances can be determined only before the installation of the antenna arrangement (for example according to the experimental method specified above). This has the advantage that the receivers to be used are already available during installation and in this way there can be a determination in experimental ways.

In accordance with an embodiment of the invention there is provision for a computer (EVC), which is linked into the European Train Control System (ETCS) and/or a train radio device (Z) and/or a computer (c) for Automatic Train Operation (ATO) to be connected as the application.

Applications are involved here, which are required in particular for automatic train operation and also for the manual driving of the train by a train driver. These applications are built into locomotives for example, wherein these must all either each be individually supplied with an antenna or must be connected jointly to a router, which for its part preferably uses a number of antennas and transceivers for different transmission frequencies. If these antennas are mounted on a vehicle, the inventive space-saving arrangement with a transmitting group and a receiving group can be profitably employed. This makes it possible to mount a number of transceivers on a vehicle.

In accordance with an embodiment of the invention there is provision for a number of applications each to have a transceiver,
   of which the transmitting module is connected to a transmitting antenna in each case and
   of which the receiving module is connected to a receiving antenna in each case.

As already mentioned, this embodiment of the invention involves an arrangement in which each of the applications is equipped with its own transceiver. This version is in widespread use and advantageously represents a low-cost and reliable option for letting the various applications communicate via radio. For this purpose the transceiver has a transmitting module and a receiving module, wherein these do not necessarily have to be mounted in one and the same housing. The function of the transceiver thus emerges as the sum of the functions of the transmitting module and the receiving module.

In accordance with an embodiment of the invention there is provision for a circulator to be provided between the transceiver and the antenna arrangement, which has a separate antenna input and antenna output and has a combined transmit and receive interface for the transceiver.

The circulator advantageously makes it possible for the transceiver also to be able to be connected to a separate transmitting antenna and a separate receiving antenna when the transceiver only has a combined connection for transmitting and receiving antenna. The circulator itself has a transmit and receive interface for the transceiver as well as a transmit interface for a transmitting antenna and a receive interface for a receiving antenna. The transmit and receive signal coming or received from the transceiver can thus be divided up between the two interfaces (receiving interface and transmitting interface).

In accordance with an embodiment of the invention there is provision for a router (R) to be connected to the antenna arrangement, wherein the router is embodied in particular as part of a Future Railway Mobile Communications System (FMRCS).

As already mentioned, FRMCS involves a standard that is intended to improve train communications in the future. This standard too can profit from the inventive transmitting groups and receiving groups of antenna arrangements. Even if the router makes it possible to connect a number of devices, a number of antennas and transceivers can still be provided. These however serve in FRMCS to operate at the same time in a number of radio networks, so that a number of transmit and receive frequencies can be used. This makes full-coverage communication possible even in cases in which a mobile radio standard might not be available, because of the presence of radio gaps or the outage of an individual transmit station for example. It is also possible to communicate via WLAN in railroad stations for example.

In accordance with an embodiment of the invention there is provision for a circulator to be provided between the router and the antenna arrangement, which has a separate antenna input and antenna output and has a combined transmit and receive interface for the router.

The advantages of using a circulator have already been explained above, so that the reader is referred to this explanation in this regard.

In accordance with an embodiment of the invention there is provision for the transmitting group and/or the receiving group to be at a distance from at least one end of the rail vehicle that amounts to at least half the required distance between transmitting group and receiving group.

The said arrangement of the transmitting group and/or the receiving group on the rail vehicle has the advantage that neighboring rail vehicles, which are joined together by means of a coupling to form a train for example can likewise be equipped according to the principle described with a transmitting group and a receiving group. Even if the vehicles are then coupled to one another, it is ensured that the required minimum distance of transmitting group and receiving group from neighboring vehicles is guaranteed. This is guaranteed by half of the required distance between transmitting group and receiving group being jointly maintained by both of the neighboring vehicles.

It is also possible to take into consideration the minimum distance for locomotives or drive units of trains only in the direction of the train to be coupled on. On the other hand the safety distance at the head of the train, i.e. at the front of the locomotive or of the drive unit does not have to be maintained if there is no provision for a coupling of further vehicles at this point.

Further details of the invention will be described below with the aid of the drawing. The same or corresponding drawing elements are labeled with the same reference characters in each case and are only explained multiple times in so far as differences between the individual figures emerge.

The exemplary embodiments explained below involve preferred forms of embodiment of the invention. In the exemplary embodiments the components of the forms of embodiment described each represent features of the invention to be considered independently of one another, which each also develop the invention independently of one another and thus are also to be seen individually or in a combination other than that shown as a component of the invention. Furthermore the forms of embodiment described are also able to be expanded by further of the features of the invention described.

DETAILED DESCRIPTION OF THE INVENTION

Figure 1:
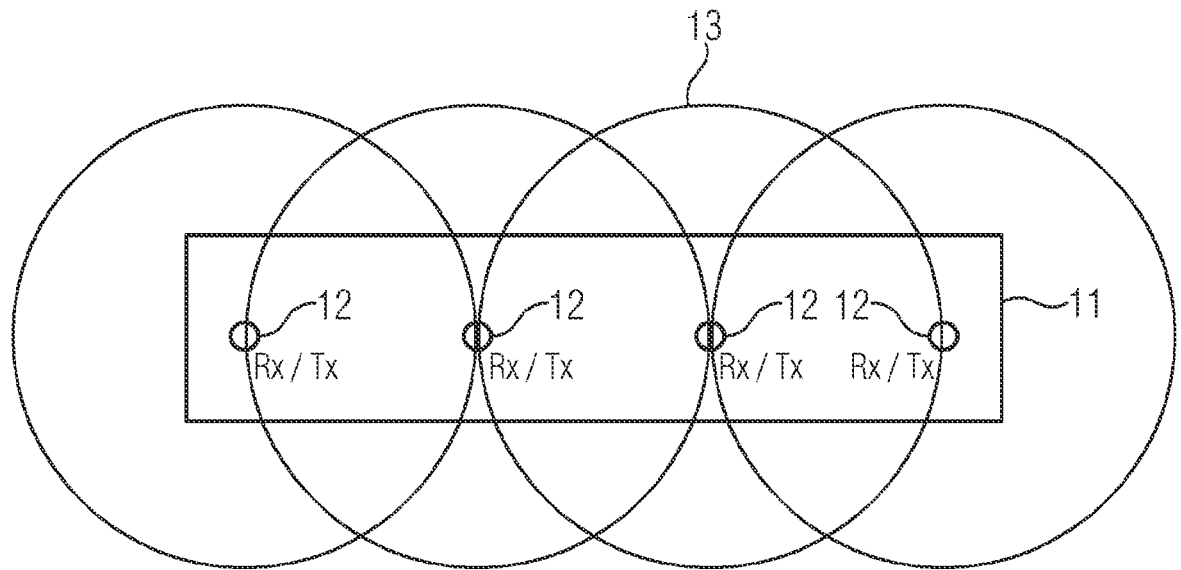
FIG. 1 shows the arrangement of combined transmitting and receiving antennas on a vehicle in accordance with the prior art as a schematic overhead view.

Shown in accordance with FIG. 1 is a rail vehicle 11, which is equipped with a number of combined transmitting and receiving antennas in accordance with the prior art. In FIG. 1 (and also in FIG. 2, for more details see below) the transmission function is labeled Tx and the receiving function is labeled Rx. The combined transmitting and receiving antennas 12 are moreover shown in FIG. 1 with an area of influence 13, which surrounds the transmitting and receiving antennas in a circular shape.

In order to guarantee that the transmitting and receiving antennas 12 do not interfere with each other when operating, neighboring transmitting and receiving antennas 12 are each arranged outside or at least at the edge of these areas of influence 13. The result of this is that only a limited number of transmitting and receiving antennas 12 can be arranged on the rail vehicle 11 (a total of four transmitting and receiving antennas 12 in the exemplary embodiment in accordance with FIG. 1).

Figure 2:
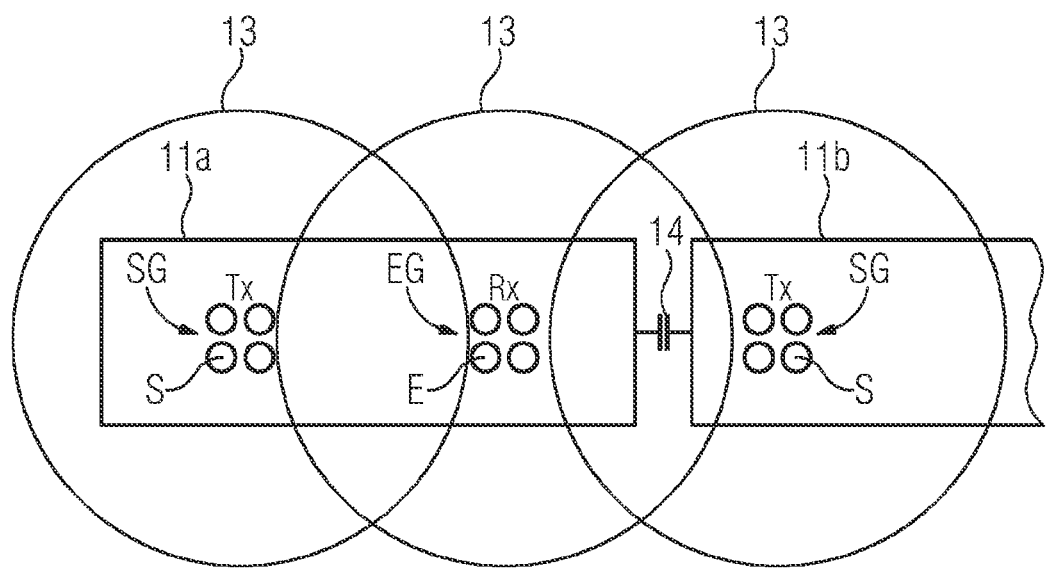
FIG. 2 shows the arrangement of transmitting antennas and receiving antennas in a transmitting group and a receiving group respectively on adjacent rail vehicles in accordance with the invention as a schematic overhead view of the rail vehicle, wherein the rail vehicle represents an exemplary embodiment in accordance with the invention.

A comparison of the rail vehicles 11a, 11b in accordance with FIG. 2 with the vehicle in accordance with FIG. 1 makes clear the differences from the state of the art. In accordance with FIG. 2 two rail vehicles 11a, 11b are coupled to one another via a coupling 14. Attached to both of the rail vehicles 11a, 11b are a transmitting module SG and a receiving module EG, wherein the transmitting module SG is composed of four transmitting antennas S and the receiving module EG is composed of four receiving antennas E (on the rail vehicle 11b the receive antennas are not shown in any greater detail). The distances between the transmitting antennas S and between the receiving antennas E is small by comparison with the distance between the transmitting groups SG and the receiving groups EG. For the arrangement of the transmitting groups SG and the receiving groups EG an area of influence is again to be noted, outside which the respective neighboring transmitting or receiving groups must lie.

It is also clear from FIG. 2 that transmitting modules SG or receiving modules EG of neighboring vehicles 11a, 11b must be at a sufficient distance from one another, so that the areas of influence 13 of these groups can be taken into consideration. Only in this way is it ensured that the transmitting modules SG or receiving modules EG of neighboring vehicles do not interfere with each other.

It is also clear from FIG. 2 that precisely as many transmitting antennas S or receiving antennas E are attached to the rail vehicle 11a as there are combined transmitting and receiving antennas 12 on the rail vehicle 11 in accordance with FIG. 1. Despite this the vehicle needs a smaller overall length than the rail vehicle in accordance with FIG. 1, without this resulting in a damaging mutual influence between neighboring antenna systems. The reason for this is that the transmitting antennas S and the receiving antennas E can be arranged with a significantly smaller distance to one another, through which the dimensions of the transmitting group SG and the receiving group EG are determined. These dimensions are significantly smaller than the distance required by the areas of influence of the groups from one another, which essentially correspond to the areas of influence 13 in accordance with FIG. 1.

Figure 3:
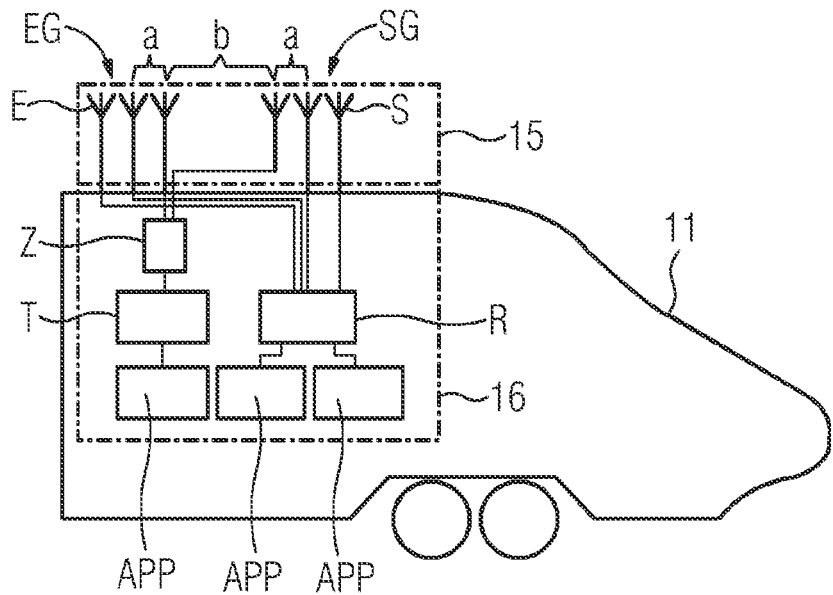
FIGS. 3 and 4 show exemplary embodiments of the inventive rail vehicle with exemplary embodiments of the inventive antenna arrangements in a schematic longitudinal cross-section in each case.
Figure 4:
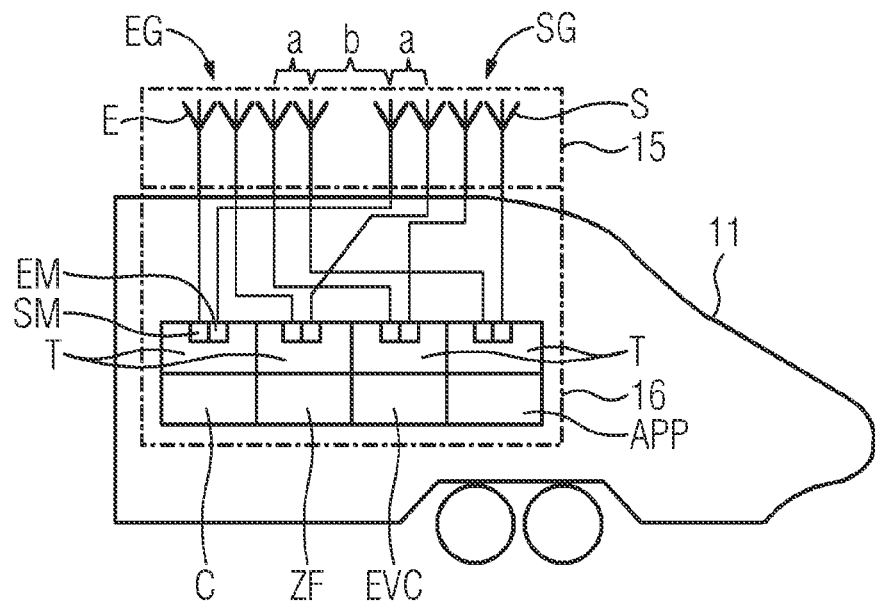

Shown in FIGS. 3 and 4 are rail vehicles 11, which are each equipped with an antenna arrangement 15 on the roof. The necessary distances a between the individual receiving antennas EG and the individual transmitting antennas SG are to be seen in the schematic diagram. Moreover the receiving group EG formed by the receiving antennas E and the transmitting group SG formed by the transmitting antennas S have a greater distance b between them. The arrangement principles in this regard have already been explained in more detail for FIG. 2, wherein the arrangement principles explained there also apply to FIGS. 3 and 4.

The antenna arrangement 15 is moreover connected via signal lines to a control facility 16 of the rail vehicle. The control facilities 16 in accordance with FIG. 3 and FIG. 4 have certain differences however, which is to be explained in greater detail below.

In accordance with FIG. 3 various applications APP are implemented in the control module 16, the more detailed functions of which are not specified in any greater detail (but can be specified as described in FIG. 4). Two of these applications APP are connected to a router R. This has two transmitting antennas S and two receiving antennas E, wherein these can transmit on different bands. This is to be shown schematically by the previously explained application example for FRMCS.

A further application APP is connected via a transceiver T to a circulator Z. The circulator Z in its turn has an antenna input for a receiving antenna E and an antenna output for a transmitting antenna S. The circulator Z has the task of guaranteeing a possibility of a connection of a transmitting antenna S and a receiving antenna E if a transceiver T with only a combined input and output is available in the rail vehicle 11 for the radio signals.

In FIG. 4 various applications APP are shown in the control facility 16, of which one is unspecified and the three others assume particular functions (applications are also involved here). One application makes available a computer C for Automatic Train Operation ATO. A further application is intended for train radio ZF. A further application consists of an EVC (European Vital Computer), which guarantees that the rail vehicle is linked into the ETCS.

In the exemplary embodiment in accordance with FIG. 4 all applications APP are connected via their own transceivers T to individual transmitting antennas S and receiving antennas E. For this purpose each transceiver T has a transmitting module SM and a receiving module EM, so that, unlike in FIG. 3 (where a circulator is required), the receiving antennas E and the transmitting antennas S can be connected directly to the transceiver T.

LIST OF REFERENCE CHARACTERS

E Receiving antenna
S Transmitting antenna
EG Receiving group
SG Transmitting group
EM Receiving module
SM Transmitting module
R Router
T Transceiver
APP Application
ZF Train radio device
EVC European Vital Computer
C Computer for Automatic Train Operation ATO
Z Circulator
a Distance
b Distance 11, 11a, 11b Rail vehicle
12 Transmitting and receiving antennas
13 Area of influence
14 Coupling
15 Antenna arrangement
16 Control facility

The invention claimed is:

1.. An antenna arrangement for mobile communication of a rail vehicle, the antenna arrangement comprising:
   at least two transmitting antennas only used for transmitting and at least two receiving antennas only used for receiving;
   said transmitting antennas being spatially grouped in a transmitting group and said receiving antennas being spatially grouped in a receiving group;
   spacing distances between said transmitting antennas being smaller than a required distance without further antennas between said transmitting group and said receiving group; and
   spacing distances between said receiving antennas being smaller than the required distance between said transmitting group and said receiving group.

2. The antenna arrangement according to claim 1, wherein at least a part of said transmitting antennas and a part of said receiving antennas are configured for at least one of a GSM-R standard or an FRMCS standard.

3. The antenna arrangement according to claim 1, wherein at least one of said transmitting group or said receiving group is a pre-installed module.

4. The antenna arrangement according to claim 1, wherein the spacing distance between said transmitting antennas and the spacing distance between said receiving antennas amounts to at least a wavelength of a transmitting band or a receiving band, respectively.

5. The antenna arrangement according to claim 1, wherein:
   a decoupling between all of said transmitting antennas of said transmitting group that is caused by an antenna spacing, and
   a decoupling between all of said receiving antennas of said receiving group that is caused by the antenna spacing,
   is greater than 10 dB.

6. The antenna arrangement according to claim 5, wherein the decoupling between said transmitting antennas caused by the antenna spacing, and the decoupling between said receiving antennas caused by the antenna spacing is greater than 15 dB.

7. The antenna arrangement according to claim 1, wherein:
   a signal coming from each of said transmitting antennas within a working band of a respective receiver to be assigned to the respective said receiving antenna is smaller than a sensitivity of the receiver reduced by a minimum signal-to-noise ratio of the signal needed for decoding; and
   a signal coming from each of said transmitting antennas outside the working band of the respective receiver is smaller than a blocking limit value of the receiver.

8. A rail vehicle, comprising:
   an antenna arrangement for mobile communication of the rail vehicle, said antenna arrangement having at least two transmitting antennas only used for transmitting and at least two receiving antennas only used for receiving;
   said transmitting antennas being spatially grouped in a transmitting group and said receiving antennas being spatially grouped in a receiving group;
   spacing distances between said transmitting antennas being smaller than a spacing distance without further antennas between said transmitting group and said receiving group; and
   spacing distances between said receiving antennas being smaller than the distance between said transmitting group and said receiving group.

9. The rail vehicle according to claim 8, wherein:
   a decoupling between all of said transmitting antennas of said transmitting group that is caused by an antenna spacing, and
   a decoupling between all of said receiving antennas of said receiving group that is caused by the antenna spacing,
   is greater than 10 dB;
   a signal coming from each of said transmitting antennas within a working band of a respective receiver that is assigned to the respective said receiving antenna is smaller than a sensitivity of the receiver reduced by a minimum signal-to-noise ratio of the signal needed for decoding; and
   a signal coming from each of said transmitting antennas outside the working band of the respective receiver is smaller than a blocking limit value of the receiver.

10. The rail vehicle according to claim 9, wherein the decoupling between said transmitting antennas caused by the antenna spacing, and the decoupling between said receiving antennas caused by the antenna spacing, is greater than 15 dB.

11. The rail vehicle according to claim 8, further comprising at least one connected application selected from the group consisting of a computer that is linked into a Train Control System, a train radio device, and a computer for Automatic Train Operation.

12. The rail vehicle according to claim 11, wherein each of a plurality of applications has a transceiver with,
   a transmitting module connected to a transmitting antenna in each case; and
   a receiving module connected to a receiving antenna in each case.

13. The rail vehicle according to claim 8, further comprising a plurality of applications each having a transceiver with:
   a transmitting module connected to a transmitting antenna in each case; and
   a receiving module connected to a receiving antenna in each case.

14. The rail vehicle according to claim 13, further comprising a circulator connected between said transceiver and said antenna arrangement, said circulator having a separate antenna input and antenna output and having a combined transmitting and receiving interface for said transceiver.

15. The rail vehicle according to claim 8, further comprising a router connected to said antenna arrangement.

16. The rail vehicle according to claim 15, wherein said router is configured for a Future Railway Mobile Communications System.

17. The rail vehicle according to claim 15, further comprising a circulator connected between said router and said antenna arrangement, said circulator having a separate antenna input and antenna output and having a combined transmitting and receiving interface for said router.

18. The rail vehicle according to claim 8, wherein said transmitting module and/or said receiving module are disposed at a distance from at least one end of the rail vehicle that amounts to at least one half of a required distance between said transmitting module and said receiving module.

* * * * *